June 11, 1963    A. D. LARUE    3,093,804
TUNABLE CAVITY RESONATOR
Filed April 17, 1961
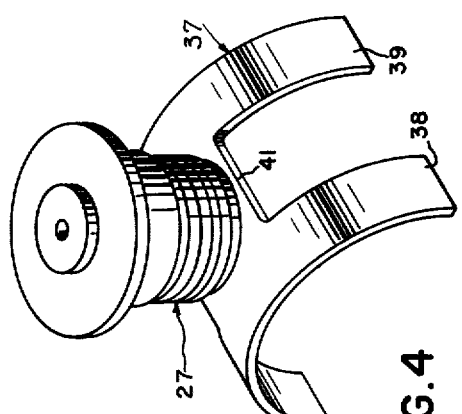
FIG.4
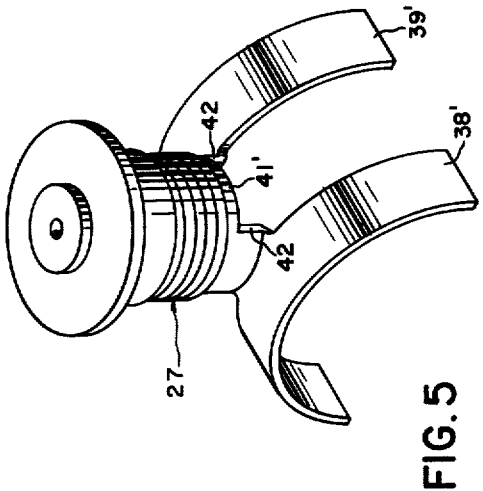
FIG.5
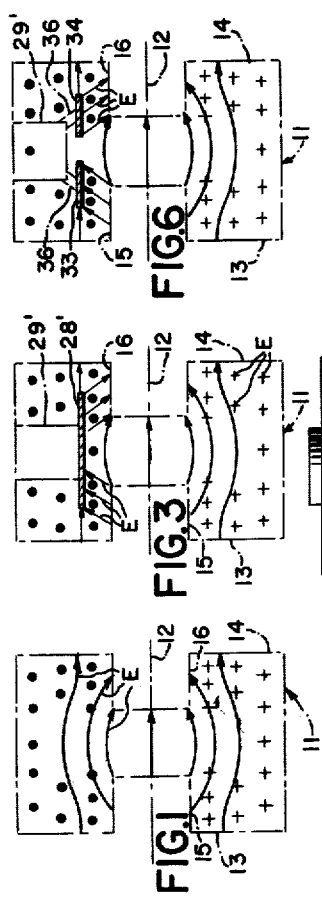
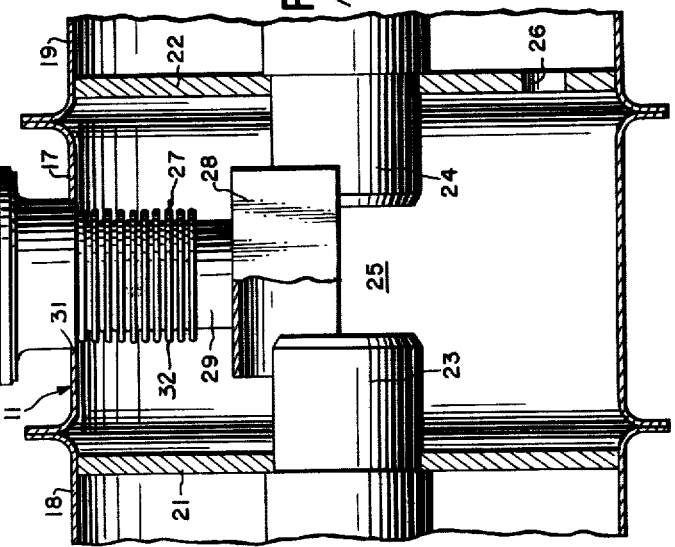
FIG.2 PRIOR ART
INVENTOR.
ALBERT D. LA RUE
BY
Wm J. Nolan
ATTORNEY

United States Patent Office 3,093,804
Patented June 11, 1963

3,093,804
TUNABLE CAVITY RESONATOR
Albert D. Larue, Los Altos, Calif., assignor to Varian Associates, Palo Alto, Calif., a corporation of California
Filed Apr. 17, 1961, Ser. No. 103,604
9 Claims. (Cl. 333—83)

This invention relates in general to tunable cavity resonators, and, more particularly, to the tuning means for such resonators to permit adjustment of the resonant frequency.

Cavity resonators are employed in klystrons to velocity modulate the electrons within the beam and to extract high frequency energy from the beam after proper bunching. The cavity resonators employed in a high-power klystron may be designed in a variety of forms, but some sort of box-like configuration is common. The drift tube which permits the passage of the beam therethrough pierces opposite sides of the box-like configuration to form a capacitive gap between the ends of drift tube section, which gap is disposed near the center of the resonator. The capacitive gap permits a strong coupling between the electron beam and the radio frequency (R.F.) electric fields in the resonator. The gap length is ordinarily substantially shorter than the distance between the two opposite sides through which the drift tube sections extend and there is a high radio frequency electric field across and close to the gap.

Cavity resonators are tuned by changing either the cavity inductance, cavity capacitance, or both. The cavity inductance can be changed by perturbing the cavity magnetic field and the cavity capacitance can be changed by perturbing its electric field. A capacitive tuner is primarily used to tune a resonator that is integral with the klystron's vacuum envelope. Although a capacitive tuner may take a number of forms, it is usually shaped to have the greatest possible effect on and produce maximum perturbation of the electric field that is located near the capacitive gap with very little mechanical motion. Thus, a semicylindrical metallic sheet or paddle whose axis is parallel to the drift tube axis is usually employed as the tuner.

In many practical cases employing a semicylindrical paddle the concomitant requirements of maximum electric field perturbation and minimum electric field asymmetry are conflicting and some compromise must be obtained. In cases where a large azimuthal asymmetry of electric field is created in the electric field, as by the close approach of the tuner to the gap, some degradation of the beam electron interaction efficiency is likely. Further the close approach of the tuner paddle to the drift tube may result in the excitation of unwanted cavity modes and undesired cavity frequencies.

Furthermore, two sets of frequencies are usually identified within a klystron. The electrons of the beam are velocity modulated at the input cavity gap at the frequency of primary interest, the fundamental operating frequency. This velocity modulation of electrons causes the electrons to bunch and the bunching process is accomplished within the drift tube length producing a beam with electron density modulation which in turn produces a large radio frequency current in the penultimate or output resonator gap. The strongly bunched beam is rich in harmonics of the fundamental electron beam modulation frequency. The second set of frequencies occurs within the cavity resonator in the form of the various and infinite number of cavity modes.

The $TM_{010}$ mode as observed in a circular cylindrical resonator is one resonant mode of the klystron's cavity resonator which mode is made to resonate at the fundamental beam modulation frequency. The $TM_{010}$ mode of the cavity is chosen to match the fundamental beam modulation frequency because this mode has a strong axially disposed electric field which occurs across the gap of the drift tube sections. If any of the higher frequency cavity modes should coincide in frequency with one of the harmonics of the fundamental electron beam modulation frequency, and if the electric field of this cavity mode also exists across the drift tube gap, then excitation of this cavity mode would occur even through it is a harmonic. Since the gap impedance is ordinarily quite low for harmonic frequencies, the second harmonic power output of the output cavity might be as much as 30 db below the fundamental power output. However, the frequency coincidence, or resonance of a higher frequency cavity mode with a harmonic of the fundamental electron beam modulation frequency gives rise to an increased gap impedance at the harmonic frequencies to produce strong electric fields within the cavity.

The problem of harmonic frequency coincidence has become very important in recent years, with the advent of the "super-power" klystron, that is klystrons which develop power over one megawatt. The power level of these large tubes is so great that psysical damage may result from the strong fields of a harmonically excited cavity mode. To date, klystrons with integral cavity resonators develop higher output power than klystrons with resonators disposed outside the vacuum envelope. Usually the tuner support of these high power klystrons is vulnerable, particularly when a thin metallic bellows is used to permit motion of the tuner. The frequencies of all the modes of a tunable cavity are effected by the motion of the tuner, some to a much larger degree than others. The modes which are most greatly perturbed by the tuner are usually referred to as "post modes," with the tuner support structure being the post.

The principal object of this invention is to provide an improved tuning structure for a "super-power" klystron.

A feature of this invention is a tuner that permits adjustment of the cavity mode frequency pattern to avoid "post mode" frequency coincidence with a harmonic of the fundamental operating frequency.

Another feature of this invention is a tuner which exhibits a differential tuning effect wherein a competing "post mode" may be shifted away from the region of a harmonic of the fundamental operating frequency.

Another feature of this invention is a capacitive tuner which tunes a resonator to the lower frequencies with less penetration into the resonator whereby the electric field about the gap remains symmetrical.

Still another feature of this invention is a capacitive tuner having two spaced semicylindrical paddles connected by their midpoint to a conductive strap and the paddles being spaced apart in the direction of the electric field vector taken across the gap of the cavity.

Still another feature of this invention is a capacitive tuner having two spaced semicylindrical paddles connected by their midpoint to a U-shaped strap wherein the strap lies further away from the axis of the semicylindrical paddles than any portion of the two paddles.

These and other features and advantages of the present invention will be more apparent after a perusal of the following specification taken in connection with the accompanying drawings wherein, FIG. 1 is a schematic representation of a cavity resonator oscillating in the $TM_{010}$ mode, illustrating its approximate electromagnetic field diagram, FIG. 2 is a longitudinal cut away view of a typical tunable cavity resonator of the prior art as used on a super power klystron, FIG. 3 is a schematic representation of a tunable cavity resonator of the prior art oscillating in the $TM'_{010}$ mode, FIG. 4 is a pictorial view of one embodiment of the improved tuner, FIG. 5 is a pictorial view of another embodiment of the improved tuner, and FIG. 6 is a schematic representation of a tunable cavity incorporating the features of the improved tuner wherein the cavity is oscillating in the $TM_{010}$ mode.

Referring to the drawing and to FIG. 1 in particular there is shown a typical cavity resonator 11 which is symmetrical about a center line 12. The resonator has spaced transverse end walls 13 and 14 with re-entrant portions 15 and 16. The resonator 11 when it is oscillating in the $TM_{010}$ mode has an electric field line, arrows E, concentrated between the re-entrant portions 15 and 16. The magnetic field lines are represented by dots ($\cdot$) to show that the magnetic lines enter the paper and crosses ($+$) to show that the magnetic lines extend out of the paper. Of course, the magnetic field lines are continuous about the center line 12. The electric field lines E are symmetrical about the center line 12 and are concentrated between and close to the re-entrant portions 15 and 16 and are directed across the gap. Each line E and the dots ($\cdot$) and crosses ($+$) substantially illustrate the relative value and location of the fields within the cavity. The illustrations of the fields have been greatly simplified for clarity and a person skilled in the art can readily determine the actual fields within the cavity for the $TM_{010}$ mode. If electrons pass across the cavity from re-entrant portion 15 to portion 16, as mentioned above, maximum interaction will be produced between the electron and the electric field E.

Referring to FIG. 2, the typical cavity resonator of FIG. 1 is incorporated in a power klystron. The resonator 11 is made of a flanged-end tubular body 17 which is welded by its flanges to two adjacent flanged-end tubular bodies 18 and 19. Apertured plates 21 and 22 which are disposed transversely within bodies 18 and 19 form the transverse end walls of the resonator; and the re-entrant portions are formed by drift tube sections 23 and 24 protruding though the apertures in plates 21 and 22, respectively. An interaction gap 25 is formed between the ends of drift tube sections 23 and 24 wherein the electric field lines for the $TM_{010}$ mode are concentrated. The electrons which drift through drift tube sections 23 and 24 cross the gap 25 and interact with the alternating electric field thereacross in the direction of the gap. High frequency energy is coupled into or out of the cavity 11 by an iris 26 in plate 22. The resonator 11 has a tuner assembly 27 which includes an elongated semicylindrical paddle 28 oriented with its major axis parallel to the major axis of the drift tube sections 23 and 24. The paddle 28 is disposed on a post 29 which extends through an opening 31 in the tubular body 17 whereby the paddle is movable towards or away from the gap 25. A metallic bellows 32 whose ends are sealed to the post 29 and the openings 31, respectively, provides the necessary flexibility in the vacuum wall to transmit motion to the paddle. The paddle 28 tunes the resonator 11 by well known physical principles in that as the paddle approaches the drift tube the electric field which is predominantly concentrated across and close to the interaction gap is perturbed so that the total capacitance of the resonator increases and the resonant frequency is depressed (or reduced). The paddle has a semi-cylindrical form which is longer than the gap 25 so that maximum capacitance is obtained when the paddle is close to the drift tube sections, to provide broader tuning without appreciably disturbing the symmetry of the electric field.

This tuning phenomenon is illustrated in FIG. 3 where like numbers and letters as in FIG. 1 represent the same objects. The tuning paddle of the prior art is illustrated by a line 28' and thus when the paddle is close to the drift tube the electric field lines E near the paddle are directed from portion 15 to the paddle and from the paddle to portion 16. These E lines are perturbed and extend substantially radially from the drift tube. There are substantially no E lines behind the paddle. Care must be taken that the paddle 28' is not placed too close to the drift tube as the electric field about the gap would become asymmetrical. The paddle 28 is made to form an arc of no more than 180° so that a practical tuner structure is produced which has minimum effect on the symmetry of the electric field. Since the paddle 28' is conductive current will flow in the axial direction and from left to right on the drawing. This current will produce a magnetic field which will add to the magnetic field between the paddle 28' and the axis 12 and subtract from the field on the other side of the paddle 28'. The net result is that some of the magnetic field lines ($\cdot$) which are in the region of the paddle are perturbed by displacing some of them closer to the center of the cavity. Thus, the inductance of the cavity is lowered. Since the resonator is shown schematically the support post 29 is shown by dash lines 29'.

The paddle 28 as it approaches the drift tubes 23 and 24 increases the total capacitance of the resonator and also decreases the inductance. A tuning paddle of this type tunes the cavity resonator because the rate of change of the capacitance is greater than the rate of change of the inductance. Therefore if the paddle 28 can be reshaped to lower the rate of change of the inductance and still maintain the same rate of change of the capacitance, the resonator would obviously tune over a broad band.

Since the electric field lines E in the region of the paddle extend substantially radially to and from the ends of the paddle the "mid-band" of the paddle 28' does little to perturb the capacitance of the resonator. Referring to FIG. 6 the tuning paddle is now represented by two aligned spaced apart lines 33 and 34 which represent the paddle 28' of FIG. 3 with the "mid-band" removed. As in FIG. 3 like numbers and letters represent the same objects as in FIG. 1. The E lines in the region of the tuner paddle are perturbed in the same manner as in FIG. 3, even though the paddle is split, but the magnetic field lines are not appreciably affected as there can not be an axial current flow. The split paddle as represented by lines 33 and 34 is supported by a suitable conductive mount 36 attached to post 29', both the mount and the post being represented schematically. In practice the mount 36, being conductive, will have some effect on the magnetic field but this effect will be much less than the effect the paddle 28 has on the magnetic field since the azimuthal distance the mount extends around the axis 12 is much smaller than the azimuthal distance the paddle 28 extends.

Referring to FIGS. 4 and 5, there are shown two typical paddle embodiments which utilize the teachings shown in FIG. 6 and which have less effect on the perturbation of the magnetic field than the paddle 28 of the prior art. In FIG. 4 a semicylindrical paddle 37 has an H-shape including two similar semicylindrical plates 38 and 39 or paddle portions spaced apart in the direction of the gap and separated by a strap 41. This paddle embodiment is paddle 28 of the prior art with material removed from the central portion thereof to form the pair of paddle portions 38 and 39 spaced apart in the direction of the gap and elongated with respect to the width of the strap 41 in a direction transverse to the electric field across the gap. The magnetic field lines in the region where material has been removed on either side of strap 41 are not perturbed as much as the magnetic field lines at strap 41 since the former part of the paddle will produce a cross section field configuration as shown in FIG. 6 and the latter part of the paddle will produce a cross section field configuration as in FIG. 3. If a tuning paddle is made to produce a cross section field configuration as shown in FIG. 6 for 180° about center line 12, the resonator 11 can be tuned to lower frequencies.

Referring to FIG. 5 showing an alternate construction for the tuner, the strap is displaced further away from the axis 12 than the semicylindrical plates or paddle portions 38' and 39'. A strap 41' is mounted on radially outwardly protruding legs 42 to produce in essence a strap having a longitudinal cross-section of U-shape formed by members 42, 41' and 42. This paddle has still less effect on the magnetic field than the paddle of FIG. 4.

The new tuner with spaced paddle portions tunes the cavity's $TM_{010}$ mode in some aspects as well as and in other aspects better than the tuner of the prior art. One improvement it has over the prior art is that the new tuner broadens the tuning band. Another improvement is that the higher-order post modes are greatly affected by the new tuner and the effectiveness of the new tuner on these higher order modes can be altered by changing the axial length of the space between the semicylindrical paddle portions 38 and 39 and the width of the strap 41. However, it is preferred not to make the axial gap in the tuner, between the paddles, longer than the axial gap length between opposed drift tube segments to prevent diminution of the desired capacitive effect of the tuner for a given sized tuner. In a typical application, a cavity of the type described and used in the prior art has the following specifications: cavity major diameter 12.4 inches, cavity height 8.5 inches, outer diameter of drift tube sections 3.5 inches, gap length 3 inches, paddle length 5 inches, and tunable over a range of frequencies from 400 to 450 megacycles per sec. The bellows of the prior art tuner, within the klystron's cavity, was punctured when it operated at a frequency range between 440 to 445 megacycles. A cold test of this cavity indicated that a post mode of oscillation interfered with the first harmonic of the fundamental frequency where the failure occurred. The same paddle was reshaped to provide spaced paddle portions using the teachings of this invention wherein the space between plates or paddle portions 38 and 39 was made 2 inches and the azimuthal length or transverse extent of the space was made 1⅞ inches measured from the end of plates 38 along the plate to the strap 41 as illustrated in FIG. 4. A cavity resonator incorporating this novel paddle operated successfully. When the cavity was cold tested the post mode which had interfered with the harmonic of the fundamental frequency of the resonator was found to be shifted to 470 megacycles, a higher frequency than the fundamental $TE_{010}$ mode frequency at which the particular cavity could resonate. As a consequence the cavity is tuned by the novel tuner over a broader band without encountering post mode interference thereby broadening the useable tunable bandwidth of the cavity.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A cavity resonator comprising a cavity wall, re-entrant means on said wall for forming a gap region of concentrated electric field lines directed across said gap, and a tuner assembly for said resonator, said tuner assembly comprising two spaced paddle portions spaced apart in the direction of the electric field taken across said gap, and support means for said paddles and for applying motion to said paddles towards and away from said gap region, and said paddles being elongated in a direction transverse to the direction of electric field lines across said gap.

2. The cavity resonator of claim 1 wherein the spacing between said paddle portions is no more than the length of said gap region.

3. A cavity resonator comprising, a cavity wall, axially aligned drift tube sections protruding through said wall forming a gap region between said sections, and a tuner assembly for said resonator, said tuner assembly comprising two spaced paddle portions spaced apart in the direction taken across said gap and said paddle portions being elongated in a direction transverse to the major axis of said drift tube sections, and support means for said paddle portions within said resonator for applying motion to said paddle portions towards and away from said gap region.

4. The cavity resonator of claim 3 wherein the spacing between said paddle portions is no more than the length of said gap region.

5. The cavity resonator of claim 3 wherein both of said paddle portions have a semicylindrical form with the axis of revolution of said paddle portions being parallel to the axis of said drift tube sections.

6. The cavity resonator of claim 3 wherein said cavity wall has an aperture through which a portion of said tuner assembly protrudes, said tuner support means includes a post, and a metal bellows concentric with said post and having one end sealed to said post and the other end sealed to the cavity wall, said paddle portions being mounted on the inner end of said post.

7. The apparatus according to claim 1 wherein said tuner assembly includes an H-shaped tuner, and wherein said support means includes a post mounted perpendicularly to said tuner symmetrically on the mid-portion of the H-shaped tuner.

8. The tuner assembly of claim 7 wherein said H-shaped tuner has a substantially concave semicylindrical surface with the center strap of said H-shaped tuner aligned parallel to the axis of the semicylindrical surface.

9. The tuner assembly of claim 8 wherein said center strap has substantially U-shaped longitudinal cross-section and extends in a direction away from said axis with each side portion of said H-shaped tuner fixed to each end of the U-shaped strap.

References Cited in the file of this patent
UNITED STATES PATENTS
2,968,013    Auld _____ Jan. 10, 1961

UNITED STATES PATENT OFFICE
CERTIFICATE OF CORRECTION

Patent No. 3,093,804  
June 11, 1963

Albert D. Larue

It is hereby certified that error appears in the above numbered patent requiring correction and that the said Letters Patent should read as corrected below.

Column 2, line 9, for "through" read -- though --.

Signed and sealed this 7th day of July 1964.

(SEAL)  
Attest:

ERNEST W. SWIDER  
Attesting Officer

EDWARD J. BRENNER  
Commissioner of Patents